US009472156B2

(12) United States Patent
Hsu et al.

(10) Patent No.: US 9,472,156 B2
(45) Date of Patent: Oct. 18, 2016

(54) METHOD AND APPARATUS FOR DRIVING A DISPLAY DEVICE

(71) Applicant: NOVATEK Microelectronics Corp., Hsin-Chu (TW)

(72) Inventors: Xie-Ren Hsu, Hsinchu (TW); Wei-Song Huang, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 14/821,796

(22) Filed: Aug. 10, 2015

(65) Prior Publication Data

US 2015/0364103 A1 Dec. 17, 2015

Related U.S. Application Data

(63) Continuation of application No. 13/170,162, filed on Jun. 27, 2011, now Pat. No. 9,142,168.

(30) Foreign Application Priority Data

Mar. 3, 2011 (TW) ............................ 100107102 A

(51) Int. Cl.
*G06F 3/038* (2013.01)
*G09G 3/36* (2006.01)

(52) U.S. Cl.
CPC .............. *G09G 3/3685* (2013.01); *G09G 3/36* (2013.01); *G09G 2290/00* (2013.01); *G09G 2310/08* (2013.01); *G09G 2320/0276* (2013.01); *G09G 2320/066* (2013.01); *G09G 2320/0673* (2013.01); *G09G 2330/021* (2013.01)

(58) Field of Classification Search
CPC ............. G09G 2320/0673; G09G 2320/0276; G09G 3/3696; G09G 2310/027; G09G 3/3685; G09G 3/36; G09G 2310/08; G09G 2320/066; G09G 2330/021; G09G 2290/00; H03M 1/785
See application file for complete search history.

(56) References Cited

U.S. PATENT DOCUMENTS

| | | | | |
|---|---|---|---|---|
| 8,149,232 B2 * | 4/2012 | Lin | ...................... | G09G 3/3696 345/212 |
| 2005/0140627 A1 | 6/2005 | Moon | | |
| 2006/0214895 A1 | 9/2006 | Shih | | |
| 2007/0285369 A1 | 12/2007 | Park | | |
| 2008/0143754 A1 | 6/2008 | Lee | | |
| 2008/0174534 A1 | 7/2008 | Park | | |
| 2008/0198151 A1 | 8/2008 | Lee | | |
| 2008/0266331 A1 | 10/2008 | Chen | | |
| 2009/0066622 A1 * | 3/2009 | Yang | ................... | G09G 3/3688 345/89 |
| 2011/0057958 A1 | 3/2011 | Morita | | |

(Continued)

FOREIGN PATENT DOCUMENTS

| | | |
|---|---|---|
| CN | 1637837 A | 7/2005 |
| CN | 101295472 A | 10/2008 |
| CN | 101206841 B | 9/2010 |

(Continued)

*Primary Examiner* — Kent Chang
*Assistant Examiner* — Gerald Oliver
(74) *Attorney, Agent, or Firm* — Winston Hsu; Scott Margo

(57) ABSTRACT

The present invention discloses a gamma voltage generator of a display driving device. The gamma voltage generator comprises a first reference voltage generator; a switch coupled to the first reference voltage generator; and a plurality of resistors connected in serial and coupled to the switch; wherein the switch controls a connection between the first reference voltage generator and the plurality of resistors.

9 Claims, 4 Drawing Sheets

(56) References Cited

U.S. PATENT DOCUMENTS

| | | | | |
|---|---|---|---|---|
| 2011/0273440 | A1 * | 11/2011 | Park | G09G 3/003 345/419 |
| 2012/0098830 | A1 | 4/2012 | Kim | |

FOREIGN PATENT DOCUMENTS

| | | | |
|---|---|---|---|
| TW | I307873 | | 3/2009 |
| TW | 201003630 | | 1/2010 |
| WO | 2010150973 | A1 | 12/2010 |

* cited by examiner

METHOD AND APPARATUS FOR DRIVING A DISPLAY DEVICE

CROSS REFERENCE TO RELATED APPLICATIONS

This application is a continuation application of U.S. application Ser. No. 13/170,162 filed on Jun. 27, 2011 and entitled "METHOD AND APPARATUS FOR DRIVING A DISPLAY DEVICE", which claims the priority benefit of Taiwan patent application number 100107102 filed on Mar. 3, 2011. The above-mentioned applications are included in their entirety herein by reference.

BACKGROUND OF THE INVENTION

1. Field of the Invention

The present invention relates to a method and apparatus for driving a display device, and more particularly, to a method and apparatus for driving a display device capable of adjusting a gamma voltage according to a difference among image properties of frames to be displayed, to reduce power consumption of the display device.

2. Description of the Prior Art

Comparing with a cathode ray tube (CRT) display device, a liquid crystal display (LCD) device is provided with advantages of lighter weight, less power consumption and less radiation contamination, and has been widely applied to various information technology (IT) products, such as computer systems, mobile phones, notebooks, digital cameras and personal digital assistants (PDAs). An operating principle of the LCD device is based on a fact that different twisted states of liquid crystals result in different polarizations and refractions on light passing through the liquid crystals. Thus, the different twisted states of the liquid crystals can be used to control an amount of the light emitted from the LCD device, so as to produce light outputs at various brightnesses, and diverse gray levels of red, green and blue light.

With growing environmental consciousness, industries have devoted efforts to develop products with low power consumption, where most products produced by IT industries are electronic devices consuming electricity. Taking the LCD device as an example, even though a standby LCD device consumes only a few watts of electric power, an operating LCD device may consume tens to hundreds of watts of electric power according to a size of the operating LCD device. A user of the LCD device does not need to watch frames with a high contrast ratio in many daily situations, such as browsing the web, doing word processing, and sending and receiving emails. How to conserve electric power in the many situations is a topic for discussion.

SUMMARY OF THE INVENTION

It is therefore an objective of the present invention to provide a gamma voltage generator for a display driving device, to reduce power consumption of the display device.

The present invention discloses a gamma voltage generator of a display driving device. The gamma voltage generator comprises a first reference voltage generator; a switch coupled to the first reference voltage generator; and a plurality of resistors connected in serial and coupled to the switch; wherein the switch controls a connection between the first reference voltage generator and the plurality of resistors.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
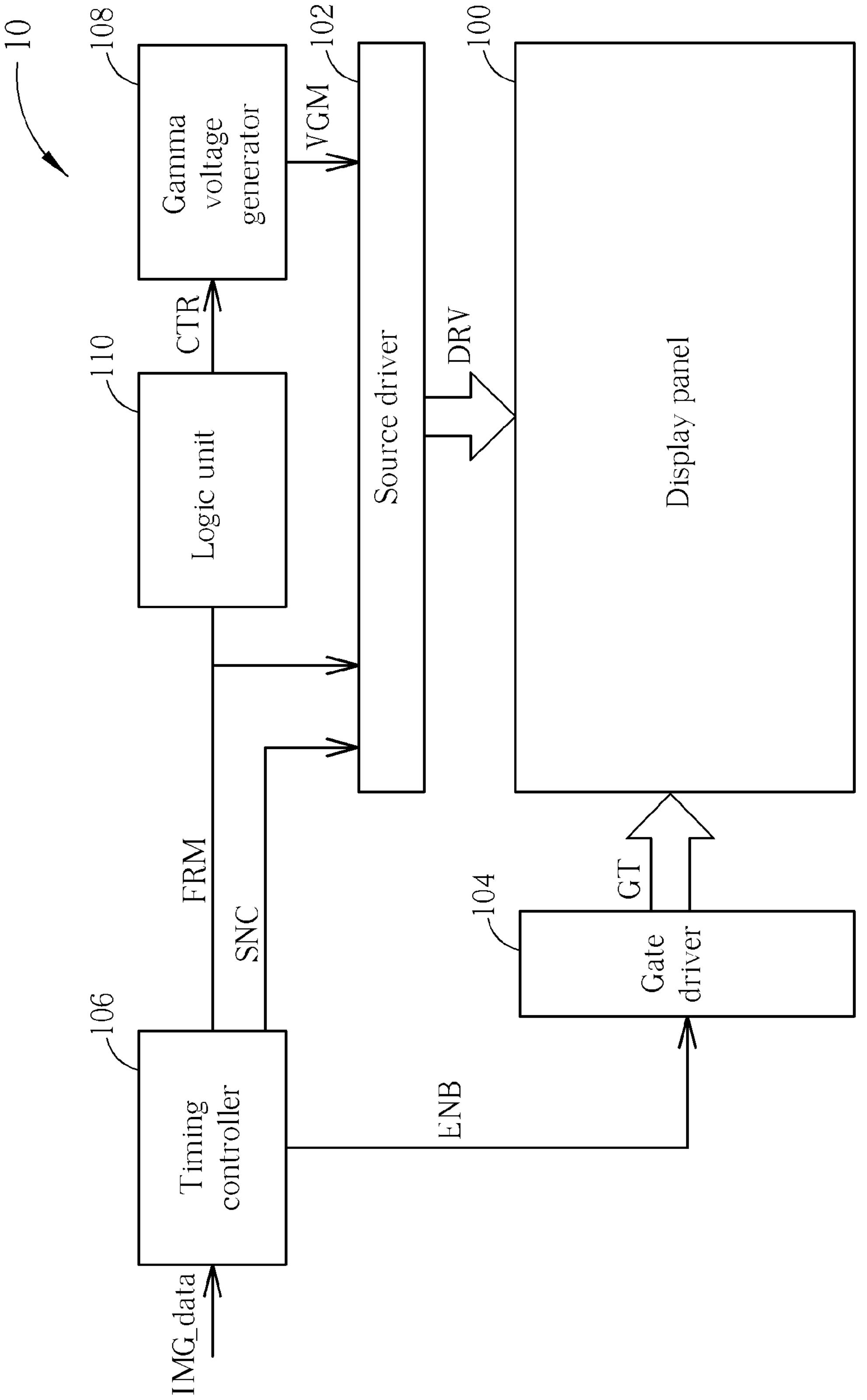
FIG. 1 is a schematic diagram of a liquid crystal display device according to an embodiment of the present invention.

Please refer to FIG. 1, which is a schematic diagram of a liquid crystal display (LCD) device 10 according to an example of the present invention. The LCD device 10 includes a display panel 100, a source driver 102, a gate driver 104, a timing controller 106, a gamma voltage generator 108 and a logic unit 110. The gamma voltage generator 108 and the logic unit 110 operate to reduce power consumption of the LCD device 10, and can be combined as a driving device or be integrated into the timing controller 106, but are not limited herein.

An operating principle of the LCD device 10 is detailed as follows. First, the timing controller 106 generates an enable signal ENB, a clock signal SNC and a frame signal FRM. Then, the gate driver 104 generates a gate signal GT corresponding to the enable signal ENB to the display panel 100, to control conducting states of thin film transistors. The source driver 102 generates a driving signal DRV to the display panel 100 according to the clock signal SNC, the frame signal FRM and a gamma voltage VGM generated by the gamma voltage generator 108, to sequentially control gray levels of pixels of the display panel 100. Finally, the display panel 100 drives twisted states of liquid crystals according to the gate signal GT and the driving signal DRV, to display corresponding frames.

The logic unit 110 receives the frame signal FRM, and generates a control signal CTR according to a difference among image properties of frames to be displayed in the frame signal FRM, such as contrast ratios. The gamma voltage generator 108 generates the gamma voltage VGM to the source driver 102 of the LCD device 10 according to the control signal CTR. In other words, the gamma voltage VGM generated by the gamma voltage generator 108 is controlled by the logic unit 110. More specifically, the gamma voltage VGM relates to the image properties of the frames to be displayed.

Please note that, in the LCD device 10, the gamma voltage VGM generated by the gamma voltage generator 108 is controlled by the logic unit 110, or the gamma voltage VGM relates to the image properties of the frames to be displayed, and corresponding modifications and alterations are within the scope of the present invention. For example, to realize the above mentioned functions, the gamma voltage generator 108 needs to generate a plurality of voltages, and outputs a voltage of the plurality of voltages as the gamma voltage VGM according to the control signal CTR. Please refer to FIG. 2, which is a schematic diagram of a voltage divider circuit 200 according to an example of the present invention. The voltage divider circuit 200 is used to realize the gamma voltage generator 108 of FIG. 1, to provide one of gamma voltages VGM_a_1-VGM_a_n as the gamma voltage VGM. The gamma voltages VGM_a_1-VGM_a_n can be reduced or retained by the voltage divider circuit 200 according to the control signal CTR. The voltage divider circuit 200 includes a reference voltage generator 202, a switch 204 and resistors R1-RN. The reference voltage generator 202 generates a reference voltage VRF, and the switch 204 controls a connection between the reference voltage generator 202 and the resistors R1-RN, to reduce or retain the gamma voltages VGM_a_1-VGM_a_n. For example, when a difference among contrast ratios of the frames to be displayed is larger than a predefined value, the logic unit 110 determines that contrast ratios of frames watched by a user do not need to be changed. Then, the logic unit 110 controls the switch 204 by using the control signal CTR, to retain the gamma voltages VGM_a_1-VGM_a_n. Oppositely, when the difference among the contrast ratios of the frames to be displayed is lower than the predefined value, the logic unit 110 determines that the contrast ratios of the frames watched by the user need to be reduced. Then, the logic unit 110 controls the switch 204 by using the control signal CTR, to connect the resistors R1-RN and resistor 206, so as to reduce the gamma voltages VGM_a_1-VGM_a_n. As a result, the power consumption of the LCD device 10 is reduced.

Figure 3:
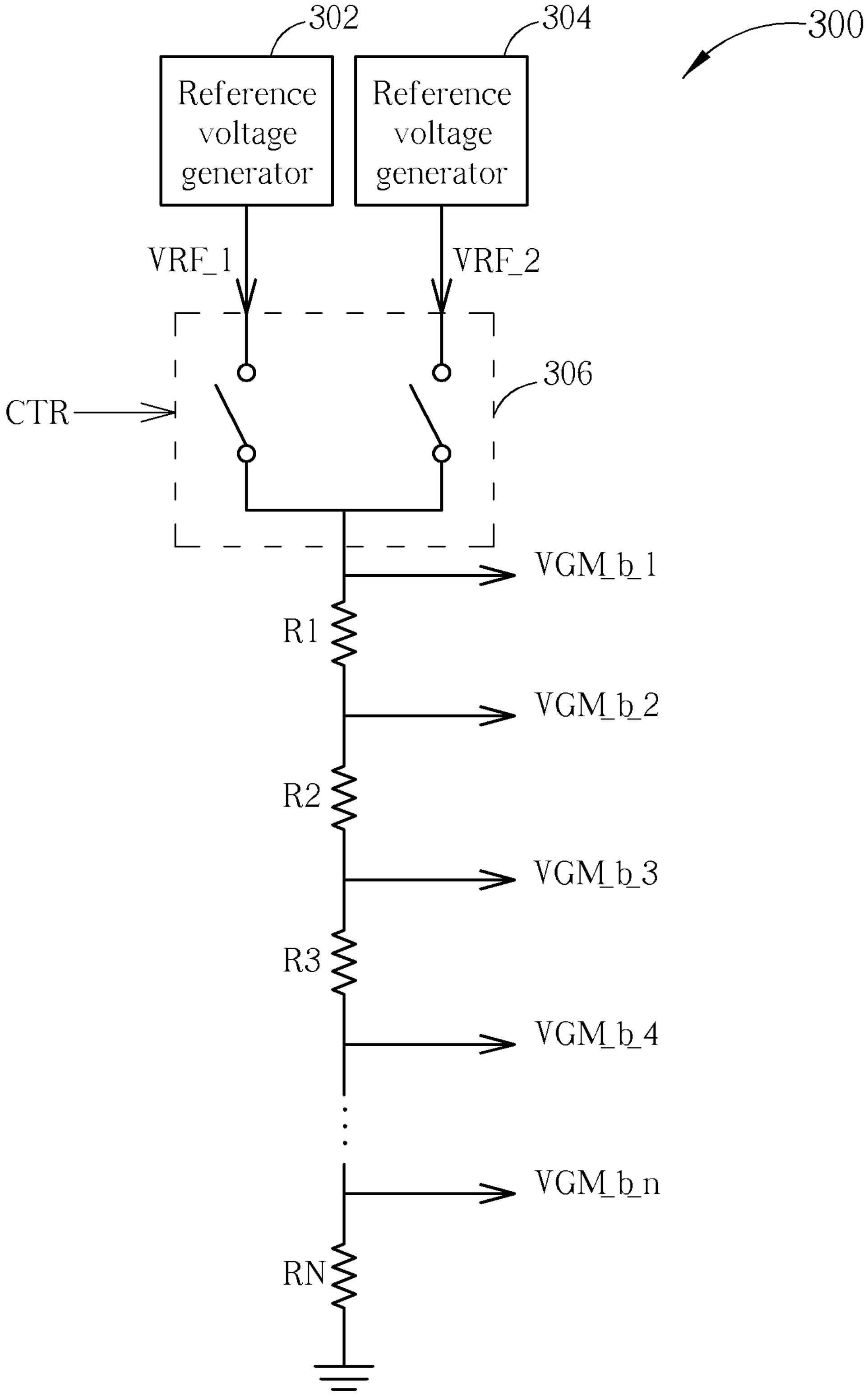
FIG. 3 is a schematic diagram of a voltage divider circuit according to an embodiment of the present invention.
Figure 4:
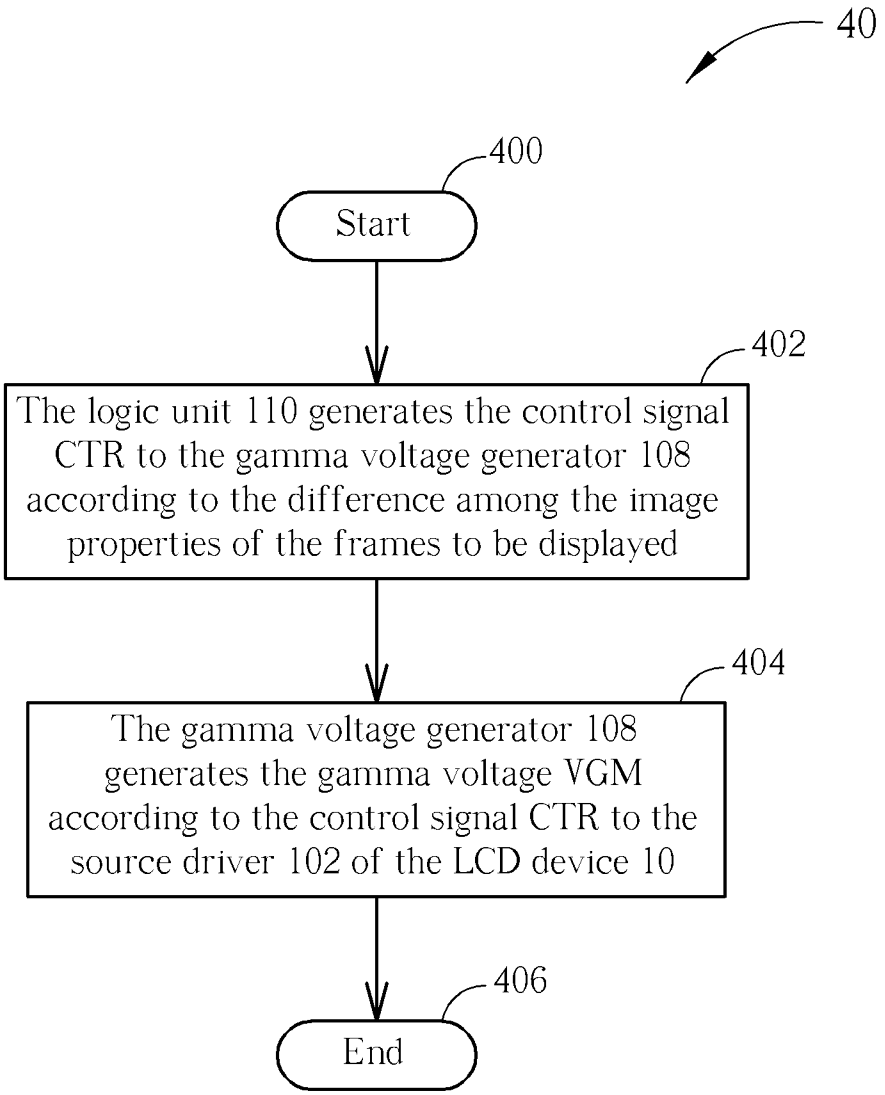
FIG. 4 is a flowchart of a process according to an embodiment of the present invention.

Please refer to FIG. 3, which is a schematic diagram of a voltage divider circuit 300 according to an example of the present invention. The voltage divider circuit 300 is used to realize the gamma voltage generator 108 of FIG. 1, to provide one of a plurality of gamma voltages VGM_b_1-VGM_b_n as the gamma voltage VGM. The gamma voltages VGM_b_1-VGM_b_n can be reduced or retained by the voltage divider circuit 300 according to the control signal CTR. The voltage divider circuit 300 includes a first reference voltage generator 302, a second reference voltage generator 304, a switch 306 and the resistors R1-RN. The first reference voltage generator 302 and the second reference voltage generator 304 generate different reference voltages VRF_1 and VRF_2, respectively. The switch 306 controls the resistors R1-RN to connect to the first reference voltage generator 302 or the second reference voltage generator 304 according to the control signal CTR. For example, VRF_1>VRF_2 is first assumed. When the difference among the contrast ratios of the frames to be displayed is larger than the predefined value, the logic unit 110 determines that the contrast ratios of the frames watched by the user do not need to be changed. Then, the logic unit 110 controls the switch 306 by using the control signal CTR, to connect the resistors R1-RN and the first reference voltage generator 302, so as to retain the gamma voltages VGM_b_1-VGM_b_n. Oppositely, when the difference among the contrast ratios of the frames to be displayed is lower than the predefined value, the logic unit 110 determines that the contrast ratios of the frames watched by the user need to be reduced. Then, the logic unit 110 controls the switch 306 by using the control signal CTR, to connect the resistors R1-RN and the second reference voltage generator 304, so as to reduce the gamma voltages VGM_b_1-VGM_b$_{13}$ n. As a result, the power consumption of the LCD device 10 is reduced.

Figure 2:
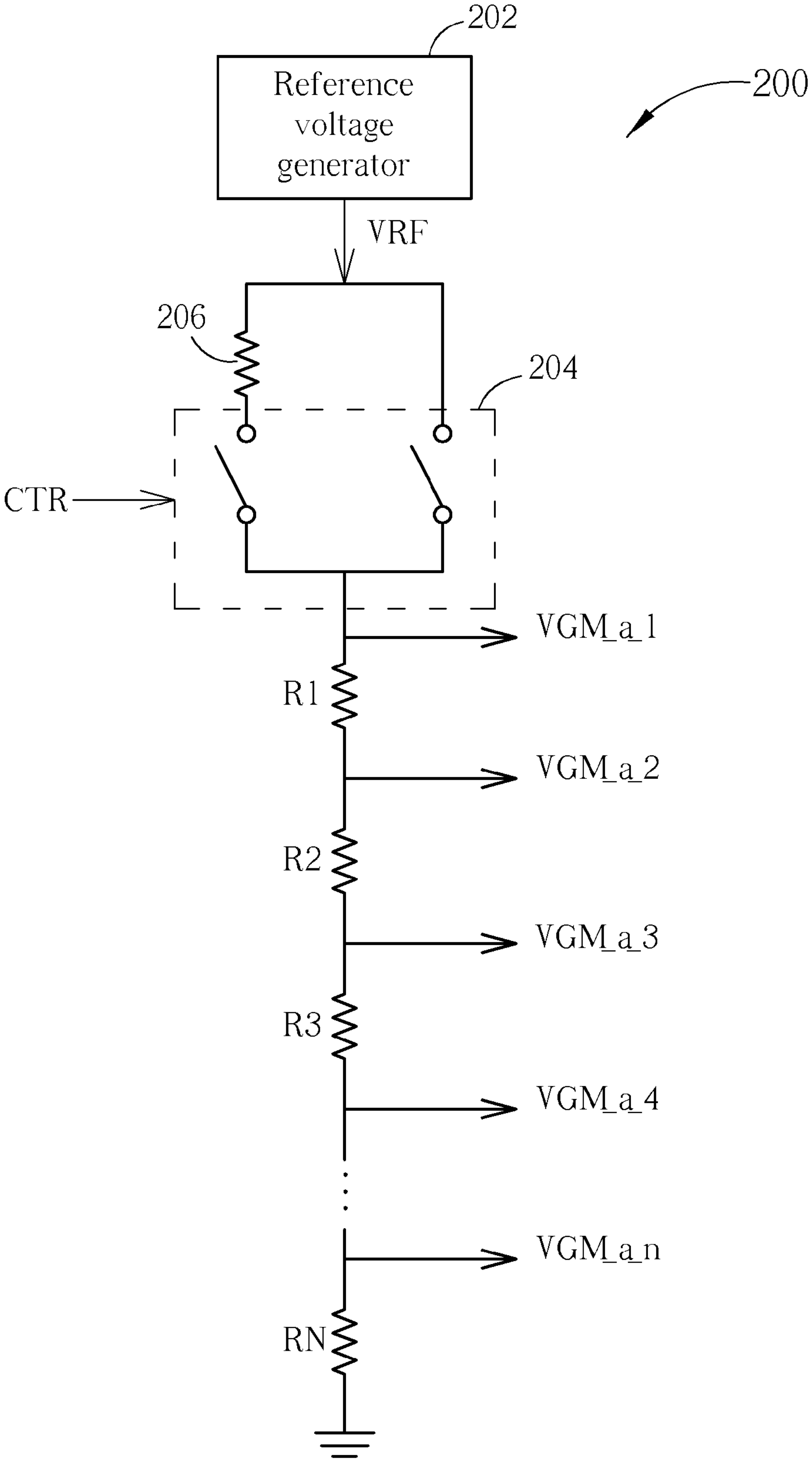
FIG. 2 is a schematic diagram of a voltage divider circuit according to an embodiment of the present invention.

Please note that, the voltage divider circuits 200 and 300 shown in FIGS. 2 and 3, respectively, are simply used to illustrate possible realizations of the gamma voltage generator 108. In practice, any circuit or device capable of adjusting the gamma voltage VGM according to the control signal CTR can be applied to the present invention, but is not limited herein. For example, in addition to adjusting the gamma voltage VGM in two steps, the gamma voltage VGM can also be adjusted in more steps, or be adjusted according to different logic operations. As known by those skilled in the art, if the gamma voltage VGM is adjusted in more steps, corresponding modifications should be made to the gamma voltage generator 108, e.g. increasing a number of reference voltage generators.

The present invention reduces power consumption according the frames to be displayed, and those skilled in the art should readily make modifications or alterations accordingly. For example, the logic 110 can generate the control signal CTR to the gamma voltage generator 108 according to a user control command or a software currently used by the user, to adjust the gamma voltage VGM. In other words, a rule of adjusting the gamma voltage VGM is not limited to consideration of the image properties of the frames to be displayed. A method of adjusting the gamma voltage VGM to reduce the power consumption is also not limited herein. For example, in addition to adjusting the gamma voltage VGM in steps as illustrated above, the power consumption can also be reduced by reducing the maximum gamma voltage and increasing the minimum gamma voltage, or by reducing a difference between the maximum gamma voltage and the minimum gamma voltage. Besides, there are many methods for determining the difference among the image properties of the frames to be displayed, e.g., determining the difference among the image properties by comparing most significant bits (MSBs) of a sub-pixel of a frame to be displayed. If the MSBs of the sub-pixel are the same, a color displayed by the sub-pixel is black or white. Otherwise, if the MSBs are the different, the color displayed by the sub-pixel is colorful. Therefore, if a number of sub-pixels of which MSBs are the same is large, the colors of the frame to be displayed are monotone. In this situation, the user may be doing an activity without needing to watch the frame with a high contrast ratio, e.g., word processing, and the logic unit 110 can adjust the gamma voltage VGM to reduce the power consumption.

Please note that, although the gamma voltage generator 108 and the logic unit 110 are separated from the timing controller 106, the gate driver 104 and the source driver 102 in FIG. 1, the gamma voltage generator 108 and the logic unit 110 can be integrated into the timing controller 106 and/or source driver 102 with improved semiconductor technology. Further, the gamma voltage generator 108, the logic unit 110, the timing controller 106, the source driver 102 and the gate driver 104 can be integrated as a single unit to reduce the cost.

Operations of the gamma voltage generator 108 and the logic unit 110 can be summarized into a process 40 as shown in FIG. 40. The process 40 includes the following steps:

Step 400: Start.

Step 402: The logic unit 110 generates the control signal CTR to the gamma voltage generator 108 according to the difference among the image properties of the frames to be displayed.

Step 404: The gamma voltage generator 108 generates the gamma voltage VGM according to the control signal CTR to the source driver 102 of the LCD device 10.

Step 406: End.

The process 40 is used to illustrate the operations of the gamma voltage generator 108 and the logic unit 110, and detailed operations of the process 40 can be referred to the above illustration, and are not narrated herein.

Please note that, an LCD device is used as an embodiment to explain the present invention. In practice, those skilled in the art can make alternations or modifications such that the driving device and the driving method of the present invention can be realized in various kinds of electronic display devices, such as a plasma display device, a cathode ray tube (CRT) display device, a projector, etc., to reduce the power consumption of the electronic display devices.

In conclusion, the present invention can adjust a gamma voltage according to a difference among image properties of frames to be displayed, to reduce the power consumption of a display device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A gamma voltage generator of a display driving device, comprising:
- a first reference voltage generator;
- a switch coupled to the first reference voltage generator;
- a plurality of resistors connected in serial and coupled to the switch; and
- a modulation resistor coupled between the first reference voltage generator and the switch;
- wherein the switch is connected between the first reference voltage generator and an input terminal of the plurality of resistors.

2. The gamma voltage generator of claim 1, wherein when a difference among contrast ratios of a plurality of frames to be displayed is lower than a predefined value, an electric current is conducted between the modulation resistor and the plurality of resistors by means of the switch, so as to reduce a plurality of voltages provided by the plurality of resistors.

3. The gamma voltage generator of claim 1, wherein when a difference among contrast ratios of a plurality of frames to be displayed is no less than a predefined value, no electric current is conducted between the modulation resistor and the plurality of resistors by means of the switch, so as to maintain a plurality of voltages provided by the plurality of resistors.

4. The gamma voltage generator of claim 1, wherein an electric current is conducted between the modulation resistor and the plurality of resistors by means of the switch according to a user control command, so as to reduce a plurality of voltages provided by the plurality of resistors.

5. The gamma voltage generator of claim 1, further comprising:
- a second reference voltage generator coupled to the switch, wherein a first reference voltage of the first reference voltage generator is higher than a second reference voltage of the second reference voltage generator.

6. The gamma voltage generator of claim 5, wherein when a difference among contrast ratios of a plurality of frames to be displayed is lower than a predefined value, an electric current is conducted between second reference voltage generator and the plurality of resistors by means of the switch.

7. The gamma voltage generator of claim 5, wherein when a difference among contrast ratios of a plurality of frames to be displayed is no less than a predefined value, an electric current is conducted between the first reference voltage generator and the plurality of resistors by means of the switch.

8. The gamma voltage generator of claim 5, wherein an electric current is conducted between second reference voltage generator and the plurality of resistors by means of the switch according to a user control command.

9. The gamma voltage generator of claim 1, wherein one of a plurality of voltages provided by the plurality of resistors is output from the gamma voltage generator to serve as a gamma voltage.

* * * * *